United States Patent
Cros (10) Patent No.: US 12,481,412 B2
(45) Date of Patent: Nov. 25, 2025

(54) SEMI-EXPANDED STATE FOR VISUALIZING CONTENT

(71) Applicant: SAP SE, Walldorf (DE)

(72) Inventor: Jean Christophe Cros, Paris (FR)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 18/350,650

(22) Filed: Jul. 11, 2023

(65) Prior Publication Data

US 2025/0021208 A1    Jan. 16, 2025

(51) Int. Cl.
*G06F 3/0482* (2013.01)
*G06F 3/04817* (2022.01)
*G06F 3/0488* (2022.01)

(52) U.S. Cl.
CPC ........ *G06F 3/0482* (2013.01); *G06F 3/04817* (2013.01); *G06F 3/0488* (2013.01)

(58) Field of Classification Search
CPC ... G06F 3/0482; G06F 3/04817; G06F 3/0488
See application file for complete search history.

(56) References Cited

U.S. PATENT DOCUMENTS

| | | | | |
|---|---|---|---|---|
| 2014/0115446 A1* | 4/2014 | Hall | ...................... | G06F 40/106 715/255 |
| 2014/0325418 A1* | 10/2014 | Tullis | .................... | G06F 3/0488 715/771 |
| 2021/0149691 A1* | 5/2021 | Schaerges | ........... | G06F 16/9038 |

* cited by examiner

*Primary Examiner* — Cao H Nguyen
(74) *Attorney, Agent, or Firm* — Fountainhead Law Group, PC (57) ABSTRACT

Content can be visualized using a semi-expanded state. A user interface can contain two or more shapes which contain selectable elements that generate popover shapes. A "semi-expanded" popover shape is generated in the user interface in response to a selection of an element of a first shape in the user interface. The popover contains information associated with a data object and it is positioned outside of and separate from the first shape. The popover is positioned on top of a second shape where a second portion of the second shape is not covered. When a selection of the first popover shape is obtained it is transformed into an expansion of the first shape which contains the information associated with the data object represented by the first shape. The second shape is repositioned outside of the expansion of the first shape.

17 Claims, 12 Drawing Sheets

SEMI-EXPANDED STATE FOR VISUALIZING CONTENT

BACKGROUND

The present disclosure pertains to visualizing content and in particular to visualizing content between a collapsed state and an expanded state.

Software applications can present large and complex visualizations of information, such as diagrams, graphs, trees, tables, and other data structures. When a large amount of information is available to be displayed in a user interface, it may be difficult to fit all of the information on screen at one time. This may cause relevant information to a user of the software application to be outside of the currently displayed area. The software application may allow for the portions of the information (e.g., shapes or elements within the user interface) being presented to be collapsed, enabling more information within the visualization to fit within the current display, and expanded, enabling other information within the visualization to fit within the current display. In some cases the software application may automatically update the visualization (e.g., automatically arranging or fitting information within the visualization) when the information to be presented changes. For example, a graph containing a plurality of nodes and edges may enable the user to expand a node within the graph to see information associated with that node that was previously hidden. Expanding a node to see such information may take up a larger area or amount of space within the display, which may cause other nodes within the visualization to be pushed outside of the current displayed area. A collapsed node may take up less area than an expanded node. Collapsing an expanded node may cause nodes to be placed into the currently displayed.

Collapsing information may enable the user to see relationships between nodes, or other elements within the user interface, and expanding information may enable the user to review additional information associated with a particular node or other element within the user interface. Thus, the expansion and collapse of a node, shape, or element in the user interface is a useful visual feature for the user. In some cases, the expansion of a node or element's shape can have an impact on the repositioning of node shapes around it within the graph, and so increase the cognitive load of the user to recognize this new layout. However, if the information in the user interface is not automatically repositioned, it may become hidden or obscured behind the newly expanded information.

There is a need for a user interface that enables the user to expand and collapse information within the user interface with reduced cognitive load from automatic repositioning and without hiding information of other information if their positions are not automatically changed. The present disclosure addresses these issue and others, as further described below.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

As mentioned above, software applications can present large and complex visualizations of information, such as diagrams, graphs, trees, tables, and other data structures. When a large amount of information is available to be displayed in a user interface, it may be difficult to fit all of the information on screen at one time. Collapsing information may enable the user to see relationships between nodes, or other elements within the user interface, and expanding information may enable the user to review additional information associated with a particular node or other element within the user interface. Thus, the expansion and collapse of a node, shape, or element in the user interface is a useful visual feature for the user. In some cases, like in the graph example above, the expansion of a node or element's shape can have an impact on the repositioning of node shapes around it within the graph, and so increase the cognitive load of the user to recognize this new layout. However, if the information in the user interface is not automatically repositioned, it may become hidden or obscured behind the newly expanded information.

To address these issues and others, the present disclosure provides techniques for a semi-expanded state for visualizing content. The techniques allow an intermediate state between a collapsed state and an expanded state, which is called a "semi-expanded" state. The semi-expanded state temporarily displays in a popover (e.g., a popover window or popover shape) information or content associated with a shape. This information could otherwise be displayed in an expanded state, which may cause other shapes within the user interface to be repositioned, which may cause the user to lose track of where the shapes are positioned within the user interface. Or, if the other shapes were not repositioned, they might become hidden or obscured, which may be confusing for the user and the user may attempt to remember where the shapes were positioned. However, the semi-expanded state avoids these issues in that the other shapes (within the graph or visualization) are not repositioned while the popover of the semi-expanded state is temporarily presented over a portion of another shape. And furthermore, the popover is offset such that a portion of a shape that would be covered by the popover is left uncovered and visible to the user.

The semi-expanded state is advantageous for diagrams and visualizations of information, such as graphs, hierarchies, trees, and other visual representations of information or data structures. Prior to describing the semi-expanded state in detail, some issues that are addressed by the semi-expanded state are described. The examples herein are given with respect to a graph data structure with nodes and edges representing entities and relationships within an entity relationship model where the nodes are visualized in the user interface as shapes and the edges are visualized as connectors between the shapes. However, the techniques may be implemented for different data structures, visualizations, and user interface visualizations in other embodiments.

Examples of a collapsed state, expanded state, and semi-expanded state are given below.

To further explain the issues that the semi-expanded state overcomes, first note that diagrams are used to show complex relationships between objects and that expandable shapes may be shown collapsed by default to simplify the content and help the user to understand immediately what the objects are and their relations. Expanding shapes may be a frequent action for a user in a diagram to confirm the identification of the object because the name may not be sufficient, for example. In that case the user may expand the shape to see the content to confirm that it is the right object, and then collapse it. Expanding shapes may also be a frequent action for the user in order to select sub-objects or review information that may only be visible in the expanded state.

However, in some cases expanding a shape may cause the layout of the diagram to automatically change (e.g., the shapes are repositioned) and the user may need some time to find their marks within the diagram due to the repositioning of the shapes. This cognitive load to map the previous and the current diagram's layout becomes higher as the diagram has more objects and relationships. To avoid the impact of a shape expansion on the layout as just mentioned, the diagram may not be automatically updated (e.g., the shapes repositioned). However, this situation also leads to difficulties for the user as shapes may become obscured, which may be misleading to the end-user. Furthermore, in some user interface designs the user cannot do a quick expand/collapse because they must move the mouse to collapse button in situations where the button is not immobile (e.g., the button is positioned on the right side and moves to the right when the shape expands towards the right to show more information).

In summary, without the semi-expanded state, which is described in detail below, there are drawbacks in prior solutions. For instance, in prior solutions, both with and without the autolayout feature there is a the cognitive load. With an autolayout performed after an expansion the user may need to find their new marks and recognize the new layout. Without an autolayout performed after an expand operation the user may be presented with misleading links and hidden shapes, and may need to remember the diagram layout when the shape was collapsed. The semi-expanded state reduces the cognitive load on the user in these two cases.

Figure 1:
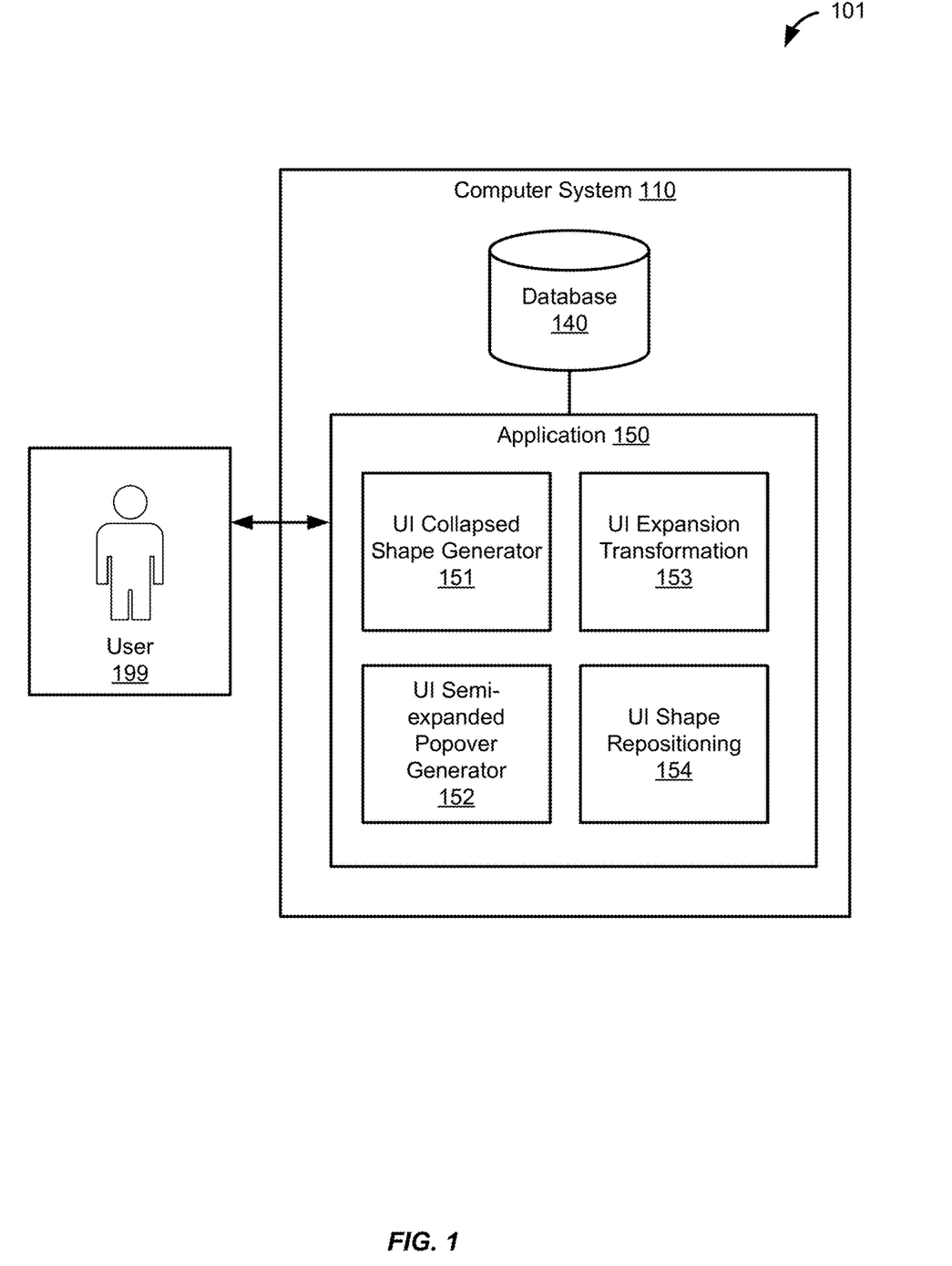
FIG. 1 shows a diagram of a computer system providing display of a semi-expanded state for visualizing content, according to an embodiment.
Figure 2:
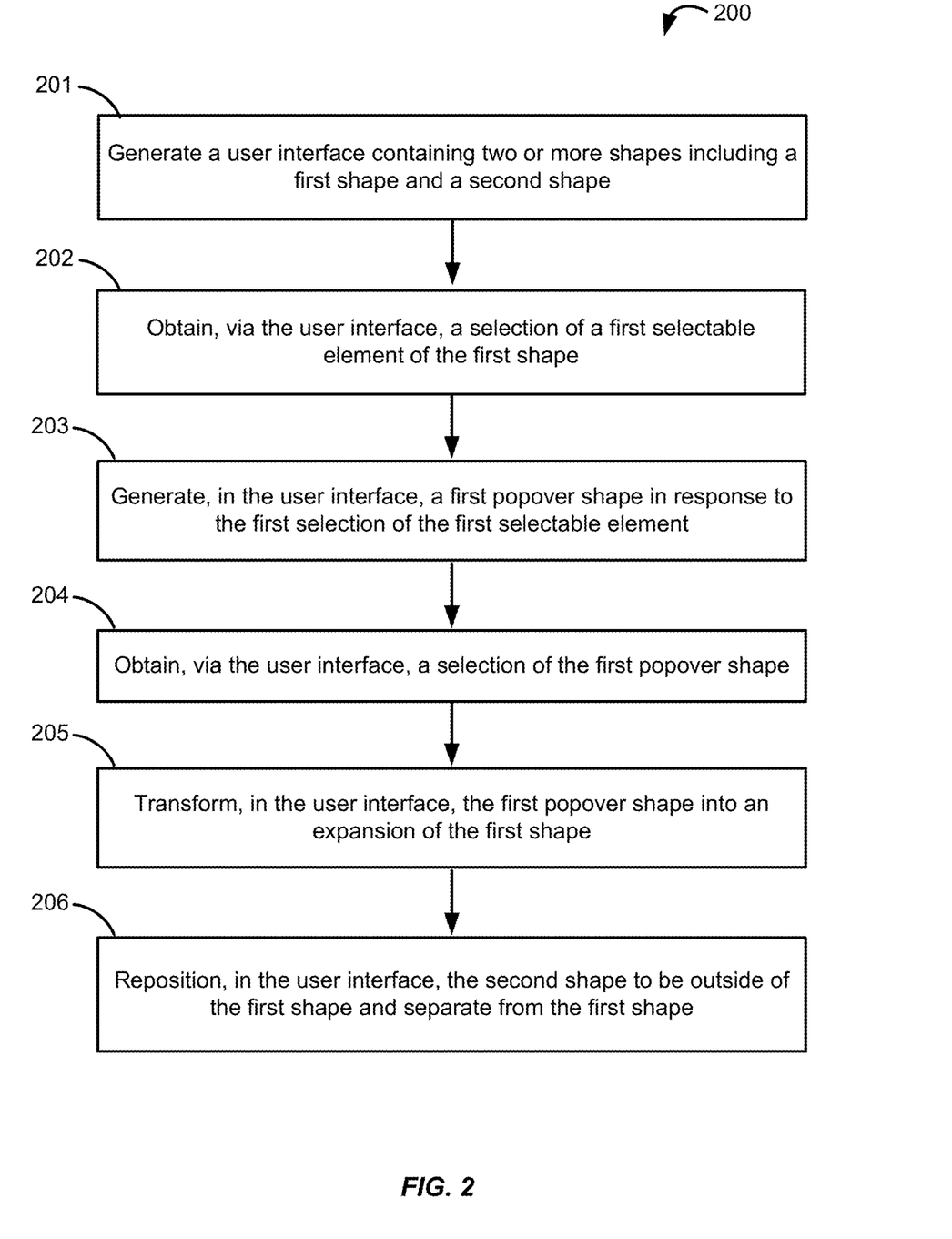
FIG. 2 shows a flowchart of a computer-implemented method for display of a semi-expanded state for visualizing content, according to an embodiment.

FIGS. 1 and 2 show a diagrams of a system and a method for display of a semi-expanded state for visualizing content. FIGS. 3-10 show various example user interfaces with shapes in the collapsed, semi-expanded, and expanded states.

FIG. 1 shows a diagram 101 of a computer system 110 providing display of a semi-expanded state for visualizing content, according to an embodiment. The computer system 110 may include one or more computer hardware machines, such as a computer server, operating in communication with one another. In some embodiments the computer system 110 may be a cloud-based computing platform or part of a cloud-based computing platform.

The computer system 110 includes a database 140 storing the models, data objects, and other information used to generate the information presented in the user interfaces described herein.

The computer system 110 is configured to provide a software application 150 to a user 199. The user may access the application 150 using a computer device or web browser, for example. The application 150 is configured to provide visualizations in the collapsed, semi-expanded, and expanded states as described herein. The application 150 includes a user interface (UI) collapsed shape generator 151 software component configured to generate shapes in the collapsed state. The application 150 also include a UI semi-expanded popover generator 152 software component configured to generate popover shapes for the semi-expanded state as described below. The application 150 also includes a UI expansion transformation 153 software component configured to transform a semi-expanded state popover into an expansion of a shape. The application 150 also includes a UI shape repositioning 154 software component configured to reposition shapes within a diagram being presented in the user interface in response to shapes being collapsed or expanded.

Examples of collapsed shapes, the semi-expanded popover, transformation of the semi-expanded popover, and shape repositioning are described below.

FIG. 2 shows a flowchart 200 of a computer-implemented method for display of a semi-expanded state for visualizing content, according to an embodiment. The method may be implemented by the computer system 110 of FIG. 1.

At 201, generate a user interface containing two or more shapes including a first shape and a second shape. Each of the two or more shapes may represent different data objects. For instance, the example UIs described below include shapes representing entities within an entity relationship model. The two or more shapes may contain selectable elements configured to generate popover shapes containing information associated with the corresponding data object. For instance, the example UIs described below have shapes containing selectable icons or text.

At 202, obtain, via the user interface, a selection of a first selectable element of the first shape. For instance, a user may select the selectable element using a click of a mouse or a touch or tap of a touch screen.

At 203, generate, in the user interface, a first popover shape in response to the first selection of the first selectable element. The first popover shape may contain information associated with a first data object represented by the first shape. For instance, the example UIs described below have shapes representing entities of an entity relationship model and a popover may show columns of a table for that entity and properties of elements in that column, or it may show relationships of that entity, depending on which selectable element (e.g., icon) is selected. The first popover shape may be positioned outside of the expansion of the first shape and separate from the expansion of the first shape. In some embodiments, the first popover shape is horizontally offset and vertically offset from the first shape such that the first popover shape is not vertically aligned or horizontally aligned with the first shape. For instance, the popover shape may be offset down and to the right as discussed below. The first popover shape may be positioned on top of a first portion of the second shape. However, a second portion of the second shape may not be covered by the first popover shape. The second portion may not be covered when the second shape is veristically aligned with the first shape but the popover of the first shape is offset towards the right, thereby uncovering the second shape.

At 204, obtain, via the user interface, a selection of the first popover shape. For instance, the user may select the first popover shape using a click of a mouse or a touch or tap of a touch screen. The user may also select the first popover shape by hovering a mouse over it.

At 205, transform, in the user interface, the first popover shape into an expansion of the first shape. The expansion of the first shape may contain the information associated with the first data object represented by the first shape.

At 206, reposition, in the user interface, the second shape to be outside of the expansion of the first shape and separate from the expansion of the first shape.

In some embodiments the method may also obtain, via the user interface, a user input within the first popover shape and reposition, within the user interface, the first popover shape closer to the first shape in response to the user input within the first popover shape.

In some embodiments the method may remove, from the user interface, the first popover shape in response to a selection outside of the first shape and the first popover shape.

In some embodiments the method may obtain, via the user interface, a selection of a third shape in the user interface. The third shape may represent a third data object and contain a third selectable element configured to generate a third popover shape containing information associated with the third data object. The third selectable element may have a same name, a same type, or a same icon as the first selectable element. For instance, the Products shape 1010 and the Order Items shape 1030 in FIG. 10 both have a columns selectable element having the same icon. In such embodiments the method may also generate, in the user interface, the third popover shape in response to the selection of the third shape without selection of the third selectable element.

In some embodiments, the first selectable element of the first shape is within a header portion of the first shape. In some embodiments, the expansion of the first shape containing the information associated with the first data object is within a body portion of the first shape.

In some embodiments, the two or more shapes represent different entity data objects within an entity relationship model.

In some embodiments, the selectable elements are configured to generate popover shapes are icons or text.

In some embodiments, the selection of the first selectable element of the first shape is a mouse click or a touch screen tap made via the user interface.

EXAMPLES

FIGS. 3-10 show various example user interfaces with shapes in the collapsed, semi-expanded, and expanded states.

Figure 3:
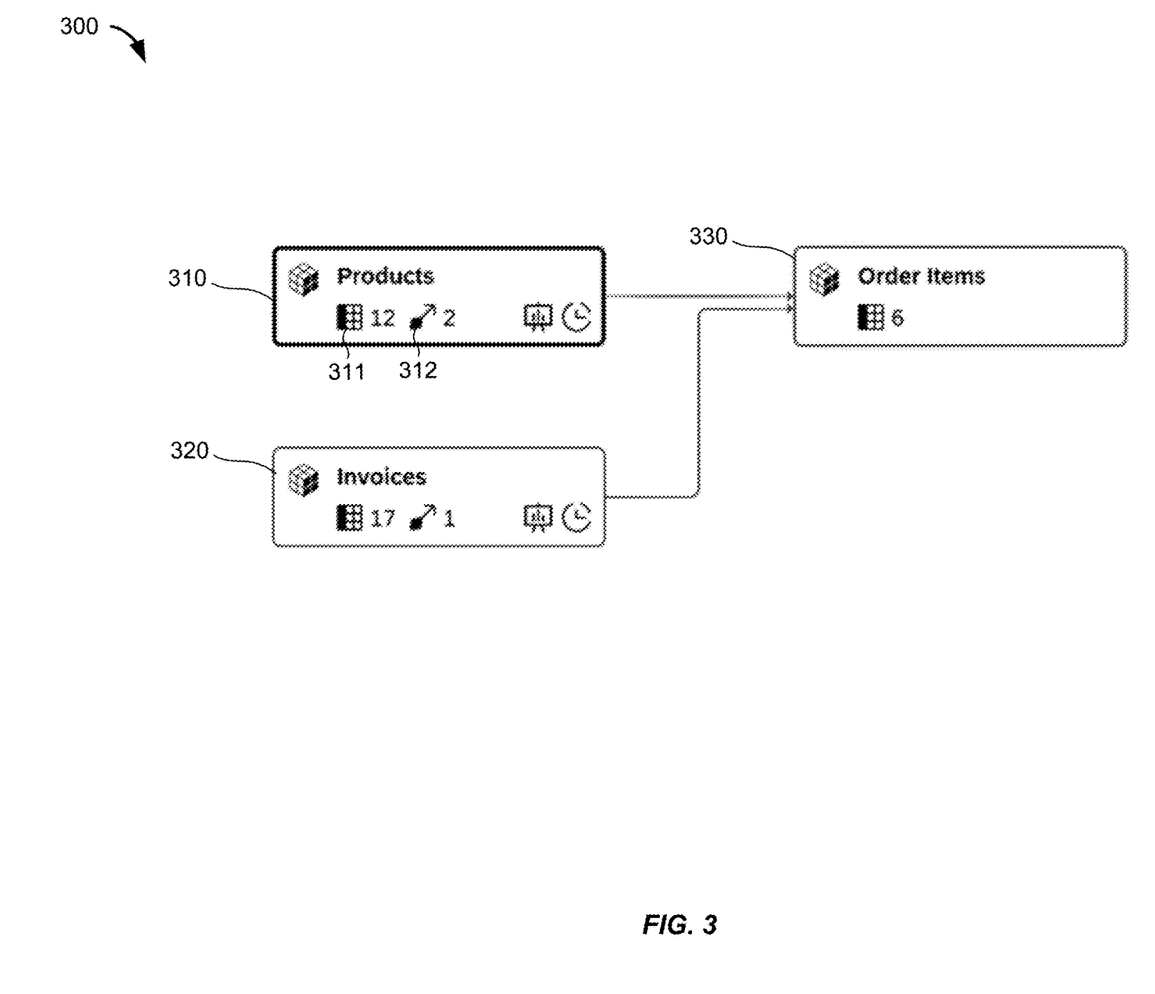
FIG. 3 shows a diagram of an example user interface containing shapes in a collapsed state, according to an embodiment.

FIG. 3 shows a diagram 300 of an example user interface containing shapes in a collapsed state, according to an embodiment. The diagram 300 shows a first "Products" shape 310, a second "Invoices" shape 320, and a third "Order Items" shape 330, each shown in the collapsed state. These shapes and the connectors between these shapes represent nodes and edges of an entity relationship model.

The first "Products" shape 310 includes a first selectable "columns" element 311 and a second selectable "relationships" element 312. These elements may be selected to show column information or relationship information, respectively, associated with the product shape. When either of the selectable elements 311, 312 are selected by a user, a popover is displayed as described below with respect to FIG. 4.

Figure 4:
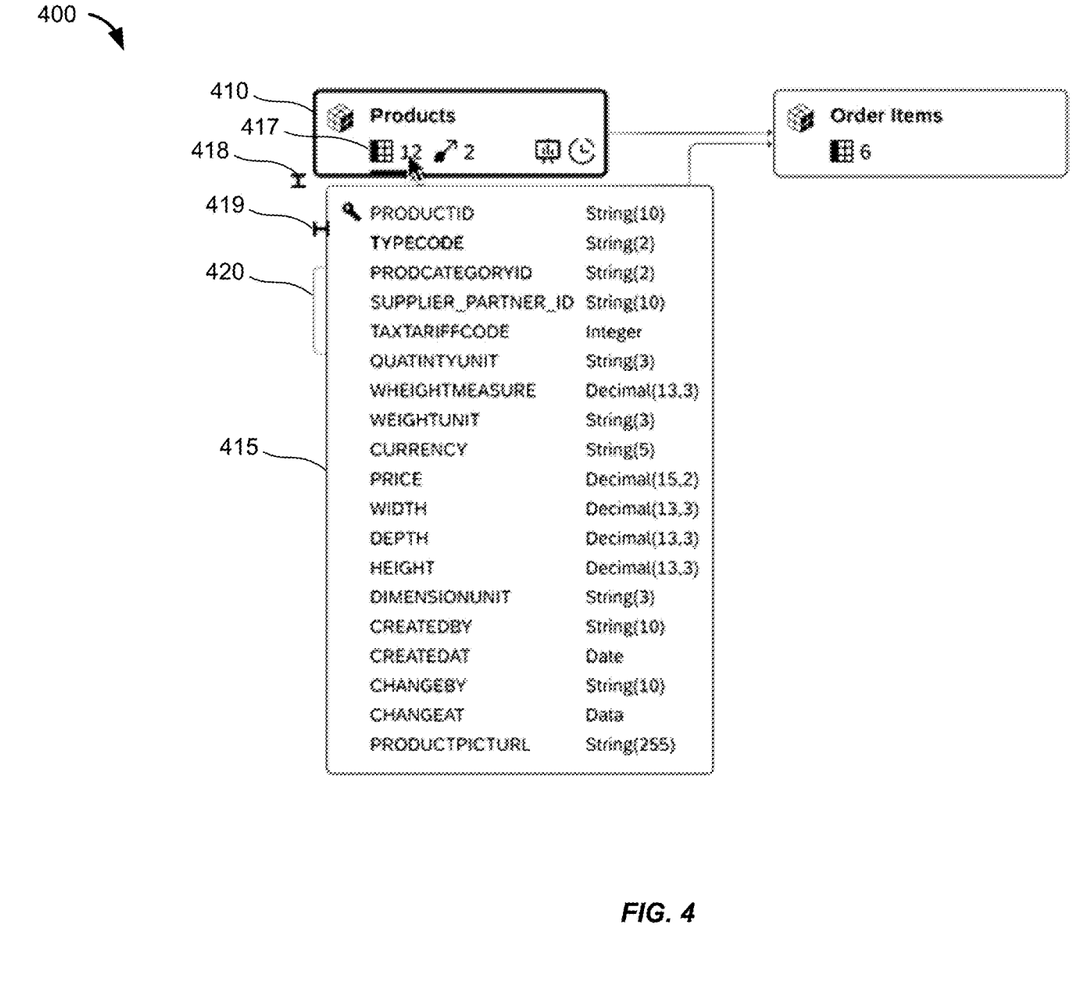
FIG. 4 shows a diagram of the example user interface with a shape in a semi-expanded state, according to an embodiment.

FIG. 4 shows a diagram 400 of the example user interface with a shape in a semi-expanded state, according to an embodiment. The diagram 400 shows a popover 415 containing information associated with the "products" shape 410 in response to a user selection of the "columns" selectable element 417. The popover 415 is offset, by a horizontal shift 419 and by a gap 418, from the products shape 410 such that a portion of the "invoices" shape 420 is visible in the user inface (see the "invoices" shape 320 in FIG. 3). From this temporary display, called "semi-expanded" state, the user can collapse or expand the shape. The collapse is done by selecting again on the same element (e.g., icon and number) 417.

Figure 5:
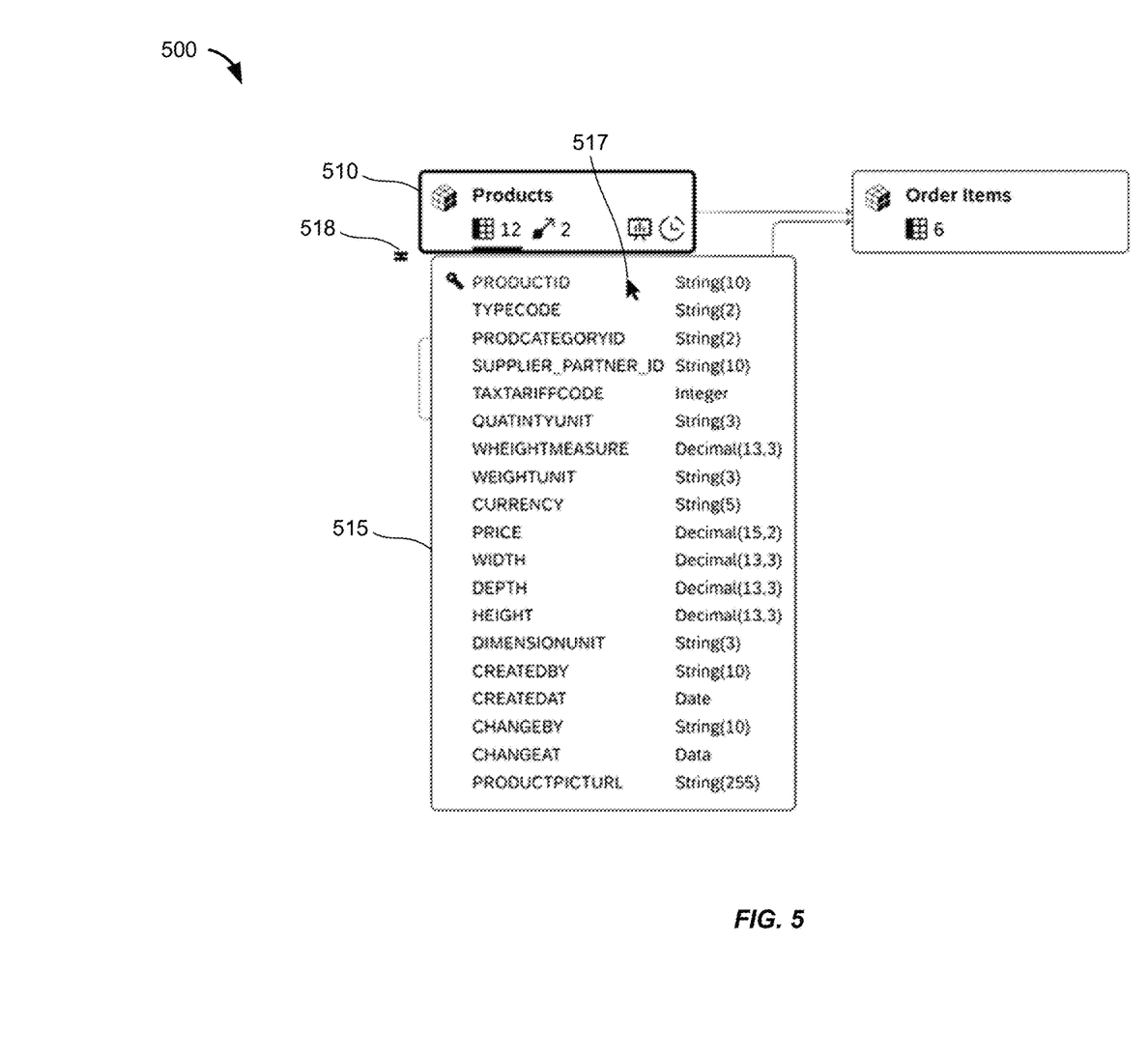
FIG. 5 shows a diagram of the example user interface with a position of the popover for the semi-expanded state being adjusted, according to an embodiment.

FIG. 5 shows a diagram 500 of the example user interface with a position of the popover for the semi-expanded state being adjusted, according to an embodiment. In this example, the expansion can be done by two user interface actions (e.g., gestures): (1) select the popover 515 with the mouse cursor 517 or drag the popover 515 toward the shape 510 to join it. To preview that, when the mouse 517 is over the popover 515, the popover 515 may move a bit closer towards the shape such that the gap 418 of FIG. 4 is reduced to the smaller gap 518.

Figure 6:
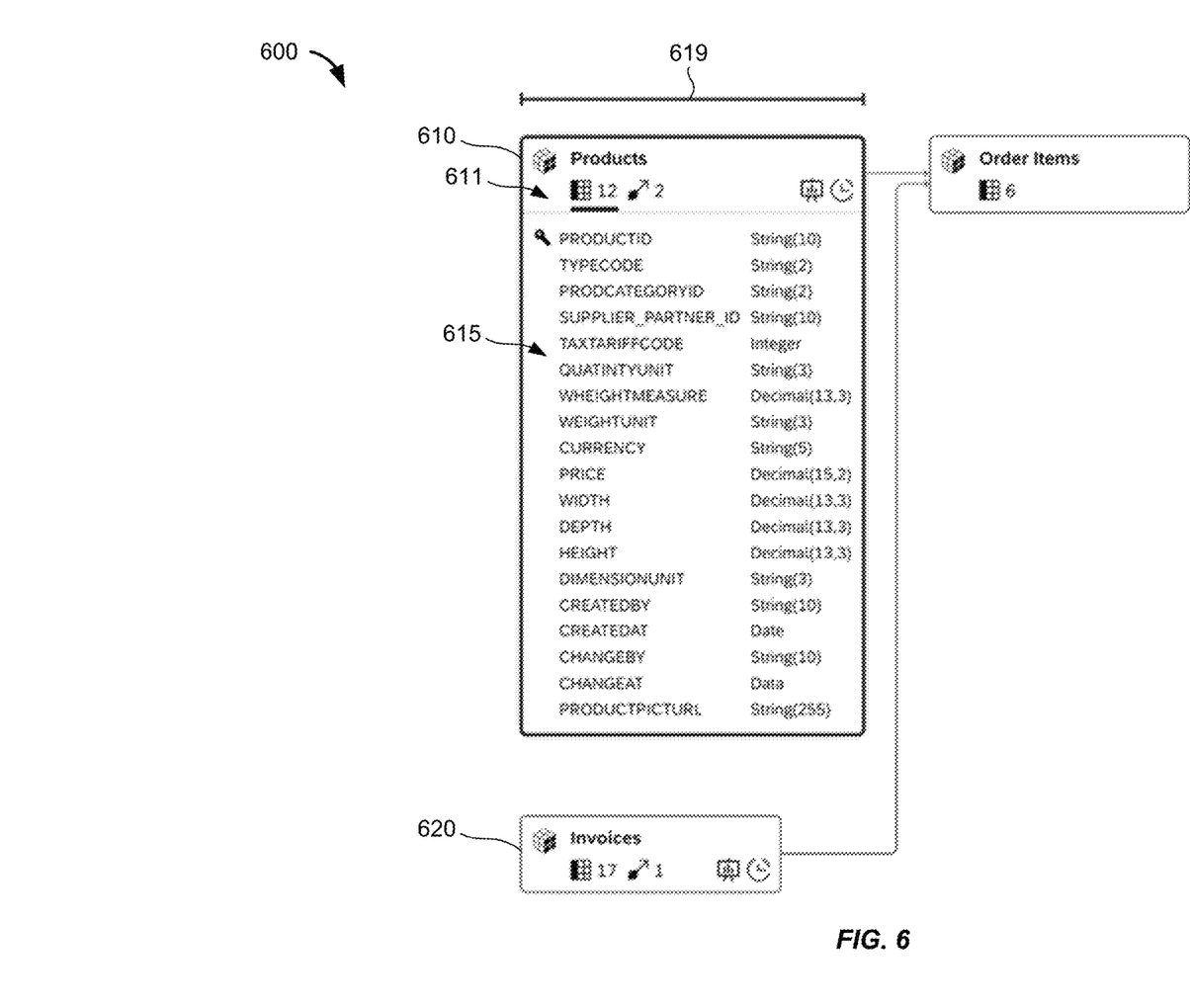
FIG. 6 shows a diagram of the example user interface after the popover for the semi-expanded state has been transformed into the expanded state, according to an embodiment.

FIG. 6 shows a diagram 600 of the example user interface after the popover for the semi-expanded state has been transformed into the expanded state, according to an embodiment. Once the expand action/gesture is performed as discussed above with respect to FIG. 5, the popover 515 of FIG. 5 is transformed into a body 615 of the "products" shape 610 which is in the expanded state. That is, the content of the popover 515 of FIG. 5 is transformed into the expanded shape 610.

As shown in diagram 600, with the "products" shape 610 being transformed into the expanded state, the "invoices" shape 620 is repositioned such that is it not covered by the "products" shape 610 or any popover.

The width 619 of the expanded shape 610 is the maximum between the width of the collapsed shape 410 of FIG. 4 and the width of the popover 515 of FIG. 5.

As shown in the diagram 600, the selectable "column" and "relationship" icon elements may be within a header portion 611 of the "products" shape 610 while the information associated with the selected element is shown within a body portion 615.

The shape can be collapsed back into the collapsed state (e.g., without the content of the body portion 615) by selecting the corresponding selectable element within the header portion 611. For instance, the column information shown in the body 615 may be removed by selecting the column icon in the header portion 611, thereby returning the diagram to the collapsed state shown in FIG. 3.

Figure 7:
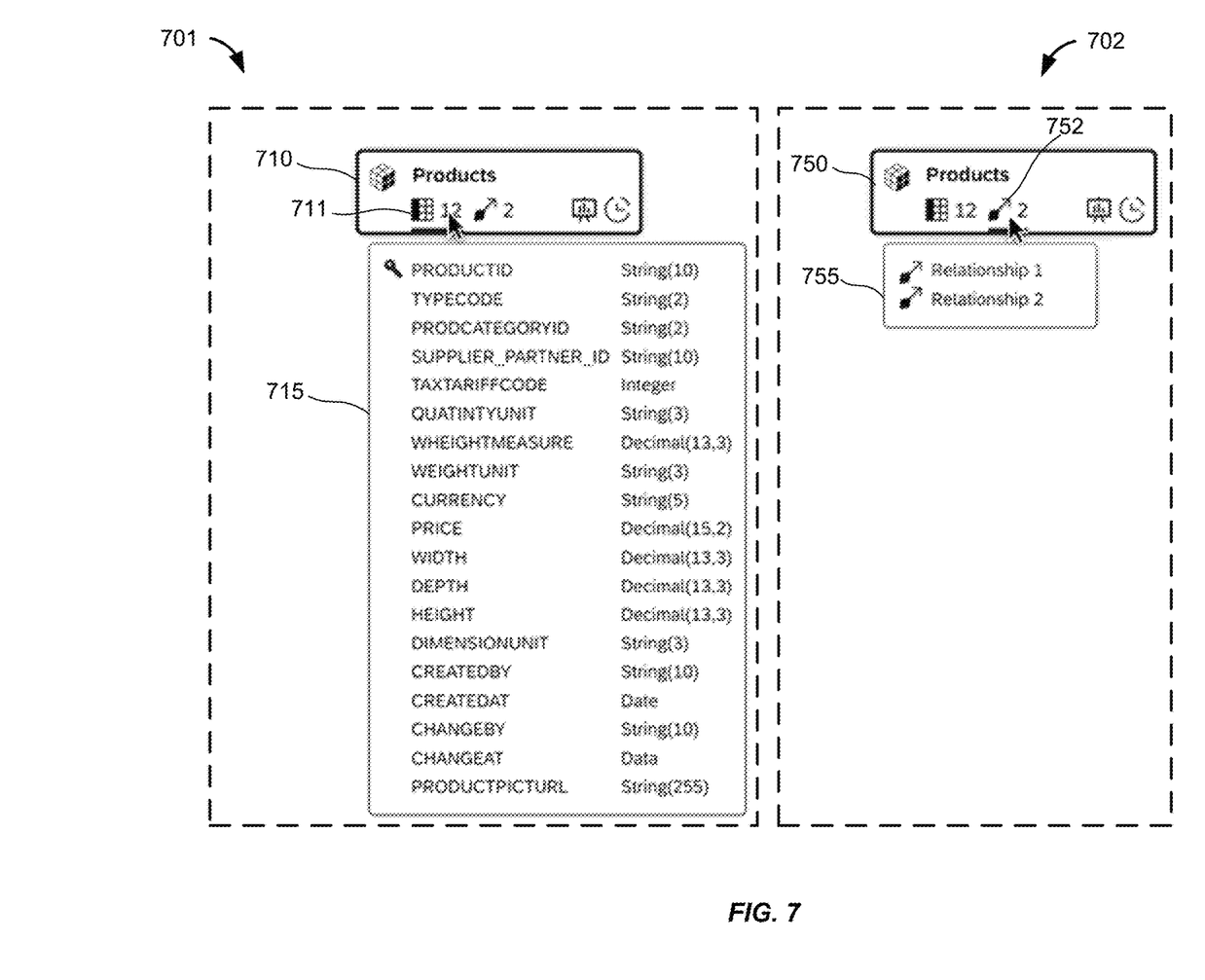
FIG. 7 shows diagrams of semi-expanded state popovers for different icons in an information bar of a shape in the example user interface, according to an embodiment.

The semi-expanded state technique can also scale to show several expanded content. FIG. 7 shows diagrams 701, 702 of semi-expanded state popovers for different icons in an information bar of a shape in the example user interface, according to an embodiment. Diagram 710 shows a "products" shape 701 with a columns icon 711 selected, which causes the "column" popover 715 to be displayed in a semi-expanded state while diagram 702 shows the "products" shape 550 with a "relationship" icon 752 selected, which causes the "relationship" popover 755 to be displayed in a semi-expanded state.

Figure 8:
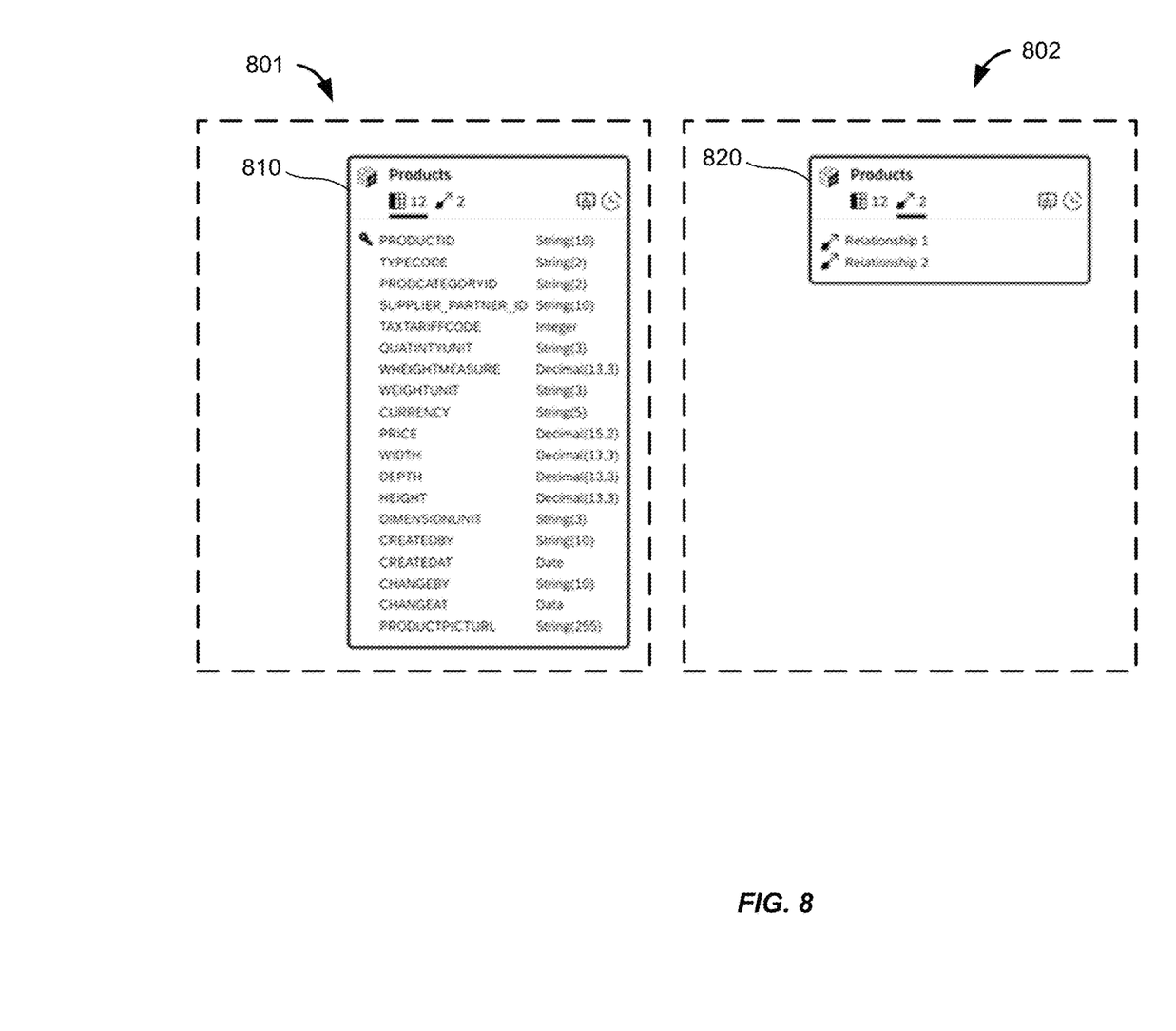
FIG. 8 shows diagrams of the example user interface after the semi-expanded state popovers for the different icons in the information bar have been transformed into the expanded state, according to an embodiment.

By defining not only one button to expand but aligning several buttons 711, 752 in a status bar (e.g., corresponding to the header portion mentioned above), the diagram can display different content "temporarily" as shown in the "column" popover 715 and the "relationship" popover 755, respectively. This information can display the content "permanently" in the expanded state as shown in FIG. 8. As used herein, the term "temporarily" refers to content that is removed from the display when the user makes a selection outside of the popover or outside of the corresponding shape (e.g., the user selects the background). For instance, the popover is "temporary."

FIG. 8 shows diagrams 801, 802 of the example user interface after the semi-expanded state popovers for the different icons in the information bar have been transformed into the expanded state, according to an embodiment. The term "permanent" refers to content that is not removed from the display when the user makes a selection outside of the corresponding shape. For instance, the expanded state is "permanent." However, this "permanent" state can be removed by selecting the corresponding selectable element (e.g., column element 711) again.

Figure 9:
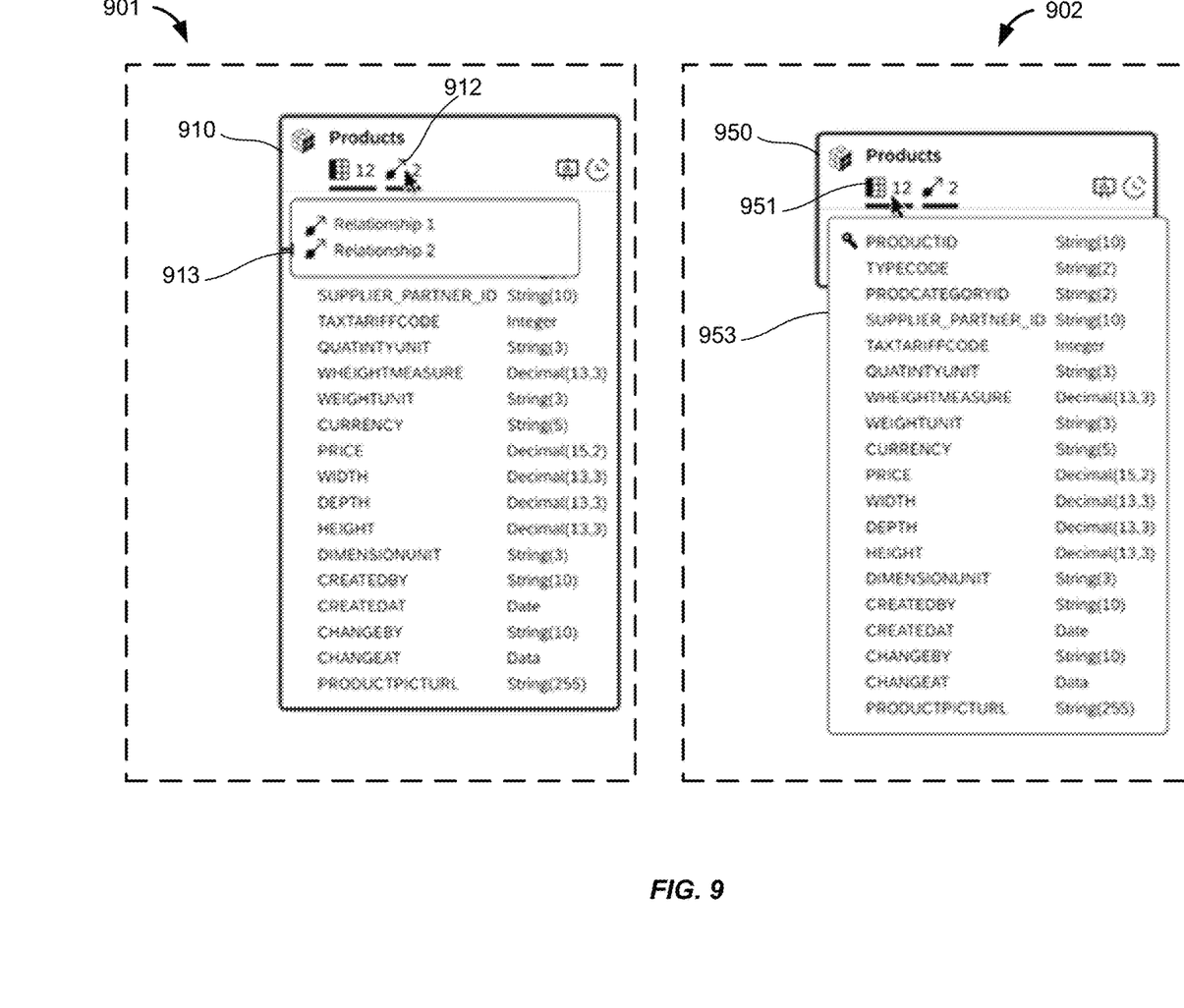
FIG. 9 shows diagrams of a shape of the example user interface in the expanded state along with a popover for a semi-expanded state on that same shape, according to an embodiment.

It is also possible to display one temporary popover over an expanded permanent shape in the same way as when the shape is collapsed. FIG. 9 shows diagrams 901, 902 of a shape of the example user interface in the expanded state along with a popover for a semi-expanded state on that same shape, according to an embodiment.

In diagram 901, a temporary "relationships" popover 913 is shown on top of a permanent columns expansion of the shape 910 in response to the user selecting the relationships icon 912.

In diagram 902, a columns popover 953 is shown on top of the relationships expansion of the shape 950 in response to a user selection of the columns icon 951.

Figure 10:
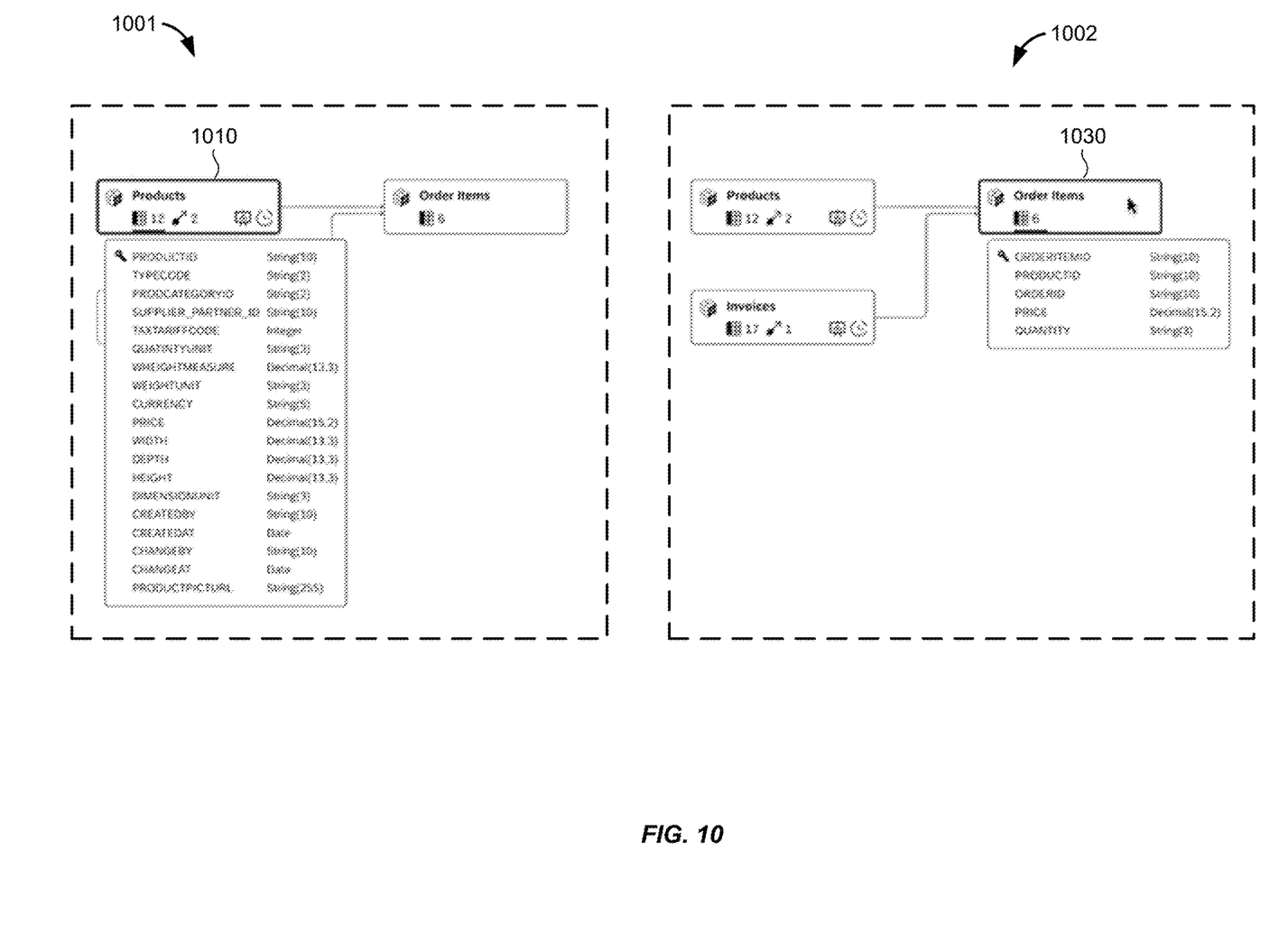
FIG. 10 shows diagrams of a shape in the example user interface in a temporary semi-expanded state and a second shape displaying in the semi-expanded state upon selection, according to an embodiment.

In addition, when content is temporarily expanded (e.g., as a popover) on a selected shape, the user can select another shape and if that shape is associated with information having the same name or the same icon, the content may automatically be displayed in a popover without the user selecting the selectable element. With this behavior, the user can decide to look at given content among many shapes by selecting them one by one. FIG. 10 shows diagrams 1001, 1002 of a shape in the example user interface in a temporary semi-expanded state and a second shape displaying in the semi-expanded state upon selection, according to an embodiment. In diagram 1001, the user has selected the columns icon of the Products shape 1010 and the columns popover is shown. In diagram 1002, the user has selected the order items shape 1030 without selecting its columns icon and the columns information associated with the order items shape 1030 is displayed in a popover.

Figure 11:
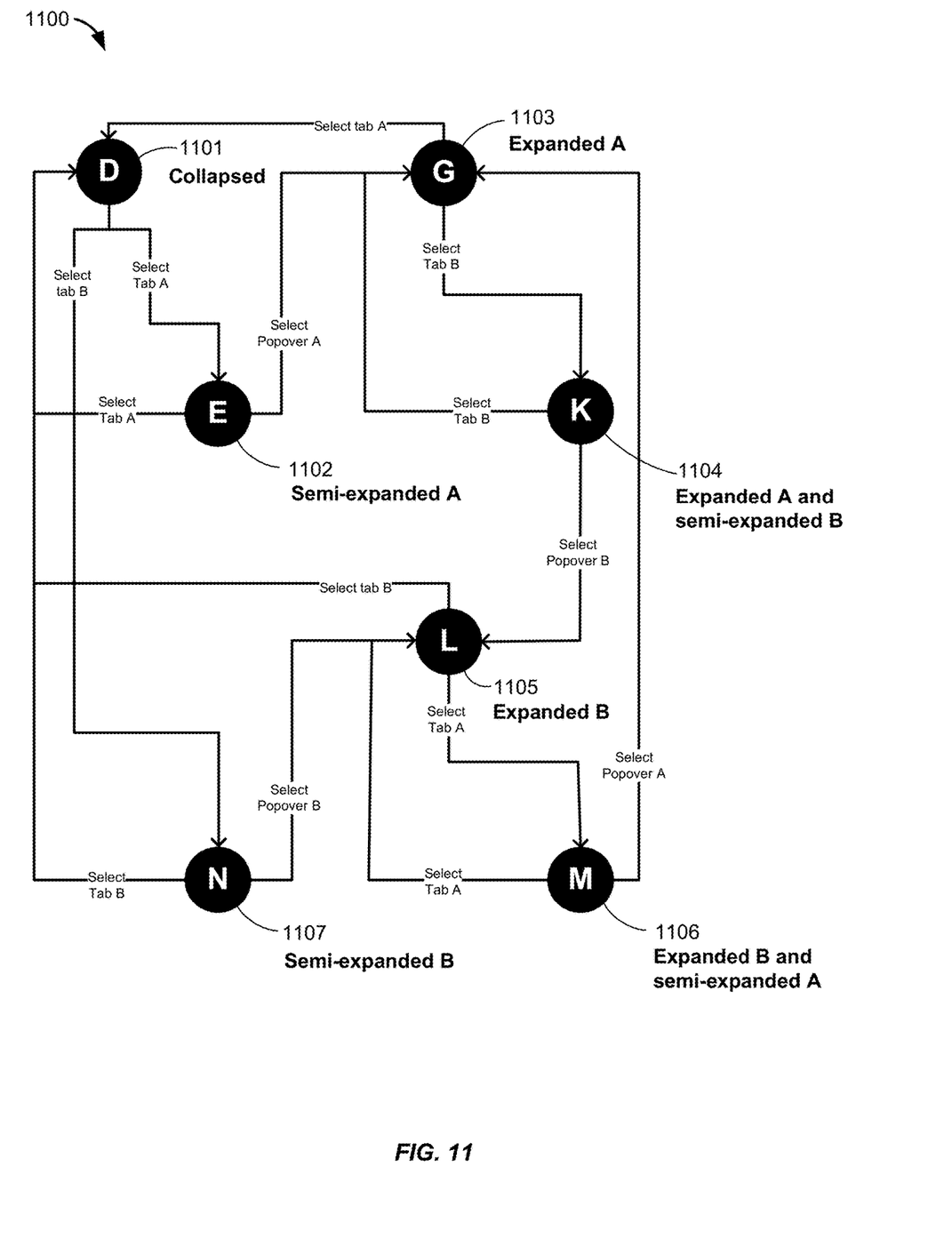
FIG. 11 shows a diagram of a state machine for a user interface providing the semi-expanded state functionality, according to an embodiment.

FIG. 11 shows a diagram 1100 of a state machine for a user interface providing the semi-expanded state functionality, according to an embodiment. The states shown in diagram 1100 refer to an "expanded" or "semi-expanded" state "A" and "B." Herein, the terms "A" and "B" refer to two different tabs (e.g., buttons, icons, or text, such as buttons 711, 752 in the status bar described above with respect to FIG. 7) of some particular shape that may be collapsed, semi-expanded, or expanded as described above.

The states in diagram 1100 include a "Collapsed" state 1101 (labeled "D"), a "Semi-expanded A" state 1102 (labeled "E"), an "Expanded A" state 1103 (labeled "G"), an "Expanded A and semi-expanded B" state 1104 (labeled "K"), an "Expanded B" state 1105 (labeled "L"), a "Semi-expanded B" state 1107 (labeled "N"), and an "Expanded B and semi-expanded A" state 1106 (labeled "M". A user of the user interface may make various selections in order to change the state, as described below.

Description of the state machine begins with the "collapsed" state 1101. From this state, if the user selects tab A (e.g., 711 in FIG. 7), the UI transitions to Semi-expanded A state 1102 in which the tab A is semi-expanded (e.g., see 715 in FIG. 7).

From the collapsed state 1101, if the user selects Tab B (e.g., 752 in FIG. 7). The UI transitions to Semi-expanded B state 1107 in which the tab B is semi-expanded (e.g., see 755 in FIG. 7).

From the collapsed state 1101, if the user selects Tab A (e.g., see 715 in FIG. 7), the UI transitions to the semi-expanded A state 1102.

From the semi-expanded A state 1102, if the user selects tab A, the UI transitions back to the collapsed state 1101.

From the semi-expanded A state 1102, if the user selects the popover A (e.g., the semi-expanded popover 715 in FIG. 7), the UI transitions to the Expanded A state 1103 (e.g., 810 in FIG. 8).

From the Expanded A state 1103, if the user selects tab A, the UI transitions back to the collapsed state 1101.

From the Expanded A state 1103, if the user selects tab B, the UI transitions to the Expanded A and semi-expanded B state 1104 (e.g., 910 with semi-expanded 913 in FIG. 9).

From the Expanded A and semi-expanded B state 1104, if the user selects Tab B, the UI transitions back from the Expanded A state 1103.

From the Expanded A and semi-expanded B state 1104, if the user selects the semi-expanded popover B (e.g., 913 in FIG. 9), the UI transitions to the Expanded B state 1105 (e.g., 820 in FIG. 8).

From the Expanded B state 1105, if the user selects Tab A, the UI transitions to the Expanded B and semi-expanded A state 1106 (e.g., see 950 and 953 in FIG. 9).

From the Expanded B state 1105, if the user selects Tab B, the UI transitions to the collapsed state 1101.

From the semi-expanded B state 1107, if the user selects the Popover B, the UI transitions to the expanded B state 1105.

From the semi-expanded B state 1107, if the user selects Tab B, the UI transitions back to the collapsed state 1101.

From the Expanded B and semi-expanded A state 1106, if the user selects Tab A, the UI transitions to the Expanded B state 1105.

From the Expanded B and semi-expanded A state 1106, if the user selects the popover A, the UI transitions to the Expanded A state 1103.

Example Hardware

Figure 12:
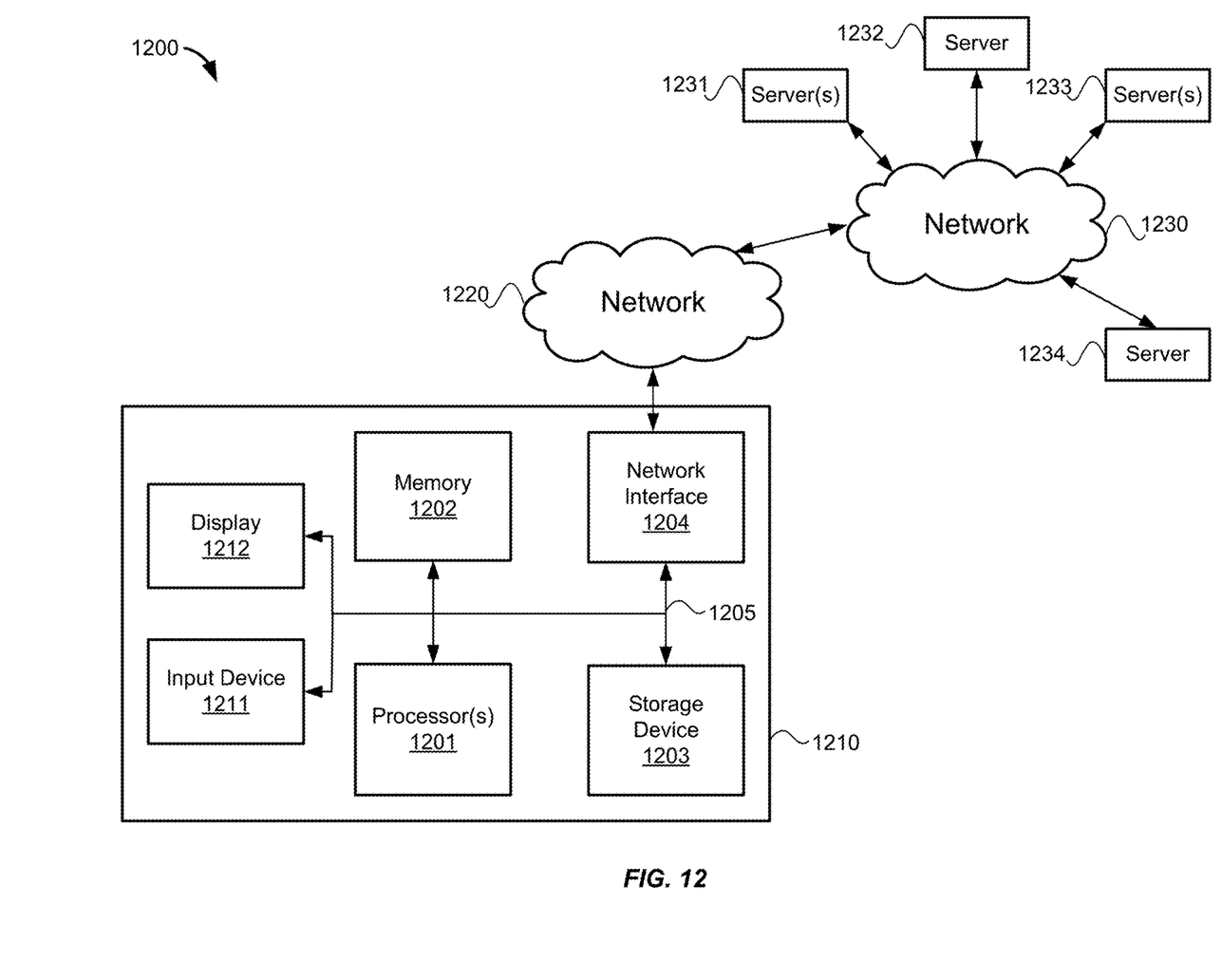
FIG. 12 shows a diagram of hardware of a special purpose computing machine for implementing systems and methods described herein.

FIG. 12 shows a diagram 1200 of hardware of a special purpose computing machine for implementing systems and methods described herein. The following hardware description is merely one example. It is to be understood that a variety of computers topologies may be used to implement the above described techniques. The hardware shown in FIG. 12 may be used to implement the computer systems and computer software (computer reprogram code) described herein.

The computer system 1210 includes a bus 1205 or other communication mechanism for communicating information, and one or more processor(s) 1201 coupled with bus 1205 for processing information. The computer system 1210 also includes a memory 1202 coupled to bus 1205 for storing information and instructions to be executed by processor 1201, including information and instructions for performing some of the techniques described above, for example. This memory may also be used for storing programs executed by processor(s) 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1203 may include source code, binary code, or software files for performing the techniques above, for example. Storage device and memory are both examples of non-transitory computer machine readable storage mediums.

The computer system 1210 may be coupled via bus 1205 to a display 1212 for displaying information to a computer user. An input device 1211 such as a keyboard, touchscreen, and/or mouse is coupled to bus 1205 for communicating information and command selections from the user to processor 1201. The combination of these components allows the user to communicate with the system. In some systems, bus 1205 represents multiple specialized buses, for example.

The computer system also includes a network interface 1204 coupled with bus 1205. The network interface 1204 may provide two-way data communication between computer system 1210 and a network 1220. The network interface 1204 may be a wireless or wired connection, for example. The network 1220 may be a local area network or an intranet, for example. The computer system 1210 can send and receive information through the network interface 1204, across the network 1220, to computer systems connected to the Internet 1230. Using the Internet 1230 the computer system 1210 may access data and features that reside on multiple different hardware servers 1231-1234. The servers 1231-1234 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets of instructions executable by the one or more processors to:
   generate a user interface containing two or more shapes including a first shape and a second shape, each of the two or more shapes representing different data objects, the two or more shapes containing selectable elements configured to generate popover shapes containing information associated with a corresponding data object;
   obtain, via the user interface, a selection of a first selectable element of the first shape;
   generate, in the user interface, a first popover shape in response to the selection of the first selectable element, the first popover shape containing information associated with a first data object represented by the first shape, the first popover shape positioned outside of the first shape and separate from the first shape, the first popover shape being positioned on top of a first portion of the second shape, a second portion of the second shape not being covered by the first popover shape;
   obtain, via the user interface, a selection of the first popover shape;
   transform, in the user interface, the first popover shape into an expansion of the first shape, the expansion of the first shape containing the information associated with the first data object represented by the first shape; and reposition, in the user interface, the second shape to be outside of the expansion of the first shape and separate from the expansion of the first shape, obtain, via the user interface, a selection of a third shape in the user interface, the third shape representing a third data object and containing a third selectable element configured to generate a third popover shape containing information associated with the third data object, the third selectable element having a same name, a same type, or a same icon as the first selectable element; and generate, in the user interface, the third popover shape in response to the selection of the third shape without selection of the third selectable element.

2. The computer system of claim 1, wherein the first popover shape is horizontally offset and vertically offset from the first shape such that the first popover shape is not vertically aligned or horizontally aligned with the first shape.

3. The computer system of claim 1, wherein the computer program code further comprises sets of instructions executable by the one or more processors to:

obtain, via the user interface, a user input within the first popover shape; and reposition, within the user interface, the first popover shape closer to the first shape in response to the user input within the first popover shape.

4. The computer system of claim 1, wherein the computer program code further comprises sets of instructions executable by the one or more processors to:

remove, from the user interface, the first popover shape in response to a selection outside of the first shape and the first popover shape.

5. The computer system of claim 1, wherein the first selectable element of the first shape is within a header portion of the first shape, and wherein the expansion of the first shape containing the information associated with the first data object is within a body portion of the first shape.

6. The computer system of claim 1, wherein the two or more shapes represent different entity data objects within an entity relationship model, wherein the selectable elements configured to generate popover shapes are icons or text, and wherein the selection of the first selectable element of the first shape is a mouse click or a touch screen tap made via the user interface.

7. A non-transitory computer-readable medium storing computer program code comprising sets of instructions to:

generate a user interface containing two or more shapes including a first shape and a second shape, each of the two or more shapes representing different data objects, the two or more shapes containing selectable elements configured to generate popover shapes containing information associated with a corresponding data object;

obtain, via the user interface, a selection of a first selectable element of the first shape;

generate, in the user interface, a first popover shape in response to the selection of the first selectable element, the first popover shape containing information associated with a first data object represented by the first shape, the first popover shape positioned outside of the first shape and separate from the first shape, the first popover shape being positioned on top of a first portion of the second shape, a second portion of the second shape not being covered by the first popover shape;

obtain, via the user interface, a selection of the first popover shape;

transform, in the user interface, the first popover shape into an expansion of the first shape, the expansion of the first shape containing the information associated with the first data object represented by the first shape;

reposition, in the user interface, the second shape to be outside of the expansion of the first shape and separate from the expansion of the first shape;

obtain, via the user interface, a selection of a third shape in the user interface, the third shape representing a third data object and containing a third selectable element configured to generate a third popover shape containing information associated with the third data object, the third selectable element having a same name, a same type, or a same icon as the first selectable element; and generate, in the user interface, the third popover shape in response to the selection of the third shape without selection of the third selectable element.

8. The non-transitory computer-readable medium of claim 7, wherein the first popover shape is horizontally offset and vertically offset from the first shape such that the first popover shape is not vertically aligned or horizontally aligned with the first shape.

9. The non-transitory computer-readable medium of claim 7, wherein the computer program code further comprises sets of instructions to:

obtain, via the user interface, a user input within the first popover shape; and reposition, within the user interface, the first popover shape closer to the first shape in response to the user input within the first popover shape.

10. The non-transitory computer-readable medium of claim 7, wherein the computer program code further comprises sets of instructions to:

remove, from the user interface, the first popover shape in response to a selection outside of the first shape and the first popover shape.

11. The non-transitory computer-readable medium of claim 7, wherein the first selectable element of the first shape is within a header portion of the first shape, and wherein the expansion of the first shape containing the information associated with the first data object is within a body portion of the first shape.

12. The non-transitory computer-readable medium of claim 7, wherein the two or more shapes represent different entity data objects within an entity relationship model, wherein the selectable elements configured to generate popover shapes are icons, and wherein the selection of the first selectable element of the first shape is a mouse click or a touch screen tap made via the user interface.

13. A computer-implemented method, comprising:

generating a user interface containing two or more shapes including a first shape and a second shape, each of the two or more shapes representing different data objects, the two or more shapes containing selectable elements configured to generate popover shapes containing information associated with a corresponding data object;

obtaining, via the user interface, a selection of a first selectable element of the first shape;

generating, in the user interface, a first popover shape in response to the selection of the first selectable element, the first popover shape containing information associated with a first data object represented by the first shape, the first popover shape positioned outside of the first shape and separate from the first shape, the first popover shape being positioned on top of a first portion of the second shape, a second portion of the second shape not being covered by the first popover shape;

obtaining, via the user interface, a selection of the first popover shape;

transforming, in the user interface, the first popover shape into an expansion of the first shape, the expansion of the first shape containing the information associated with the first data object represented by the first shape;

repositioning, in the user interface, the second shape to be outside of the expansion of the first shape and separate from the expansion of the first shape;

obtaining, via the user interface, a selection of a third shape in the user interface, the third shape representing a third data object and containing a third selectable element configured to generate a third popover shape containing information associated with the third data object, the third selectable element having a same name, a same type, or a same icon as the first selectable element; and generating, in the user interface, the third popover shape in response to the selection of the third shape without selection of the third selectable element.

14. The computer-implemented method of claim 13, wherein the first popover shape is horizontally offset and vertically offset from the first shape such that the first popover shape is not vertically aligned or horizontally aligned with the first shape.

15. The computer-implemented method of claim 13, further comprising:

obtaining, via the user interface, a user input within the first popover shape; and repositioning, within the user interface, the first popover shape closer to the first shape in response to the user input within the first popover shape.

16. The computer-implemented method of claim 13, further comprising:

removing, from the user interface, the first popover shape in response to a selection outside of the first shape and the first popover shape.

17. The computer-implemented method of claim 13, wherein the first selectable element of the first shape is within a header portion of the first shape, and wherein the expansion of the first shape containing the information associated with the first data object is within a body portion of the first shape.

* * * * *